(12) United States Patent
Lyons et al.

(10) Patent No.: US 12,446,914 B2
(45) Date of Patent: Oct. 21, 2025

(54) ULTRASONIC SURGICAL INSTRUMENTS FOR DETECTING WEAR IN JAW LINER

(71) Applicant: Covidien LP, Mansfield, MA (US)

(72) Inventors: Michael B. Lyons, Boulder, CO (US); David J. Van Tol, Boulder, CO (US); Kenneth E. Netzel, Loveland, CO (US); Matthew S. Cowley, Frederick, CO (US); Keith W. Malang, Longmont, CO (US); Richard L. Croft, Mead, CO (US)

(73) Assignee: Covidien LP, Mansfield, MA (US)

( * ) Notice: Subject to any disclaimer, the term of this patent is extended or adjusted under 35 U.S.C. 154(b) by 172 days.

(21) Appl. No.: 18/558,330

(22) PCT Filed: Apr. 25, 2022

(86) PCT No.: PCT/IB2022/053815
§ 371 (c)(1),
(2) Date: Oct. 31, 2023

(87) PCT Pub. No.: WO2022/234385
PCT Pub. Date: Nov. 10, 2022

(65) Prior Publication Data
US 2024/0180581 A1 Jun. 6, 2024

Related U.S. Application Data

(60) Provisional application No. 63/183,255, filed on May 3, 2021.

(51) Int. Cl.
*A61B 17/32* (2006.01)
*A61B 17/00* (2006.01)

(52) U.S. Cl.
CPC ............... *A61B 17/320092* (2013.01); *A61B 2017/00119* (2013.01); *A61B 2017/00853* (2013.01)

(58) Field of Classification Search
CPC .. A61B 17/320092; A61B 2017/00119; A61B 2017/00853
See application file for complete search history.

(56) References Cited

U.S. PATENT DOCUMENTS 7,805,834 B2 10/2010 White et al.
9,375,262 B2 6/2016 Reschke et al.
(Continued)

FOREIGN PATENT DOCUMENTS

CN 108697461 A 10/2018

OTHER PUBLICATIONS

International Search Report and Written Opinion issued in corresponding International Application No. PCT/IB2022/053815 mailed Jul. 27, 2022, Jun. 27, 2022.

(Continued)

*Primary Examiner* — Ashley L Fishback

(57) ABSTRACT

An end effector assembly of an ultrasonic surgical instrument includes an ultrasonic blade configured to mechanically couple to an ultrasonic transducer configured to transmit ultrasonic vibration energy to the ultrasonic blade and a jaw member movable relative to the ultrasonic blade from a spaced-apart position to an approximated position for clamping tissue therebetween. The jaw member includes a structural body and a jaw liner engaged with the structural body. The jaw liner defines a tissue contacting surface positioned to oppose the ultrasonic blade in the approximated position, and includes a wear indicator disposed within the jaw liner and configured to provide an alert indicating that the jaw liner is worn beyond a pre-determined threshold.

20 Claims, 4 Drawing Sheets

(56) References Cited

U.S. PATENT DOCUMENTS

| | | |
|---|---|---|
| 10,555,750 B2 | 2/2020 | Conlon et al. |
| 10,729,458 B2 | 8/2020 | Stoddard et al. |
| 11,266,430 B2 | 3/2022 | Clauda et al. |
| 11,701,139 B2 | 7/2023 | Nott et al. |
| 11,701,162 B2 | 7/2023 | Cuti et al. |
| 2002/0028110 A1 | 3/2002 | Rhee et al. |
| 2007/0074807 A1* | 4/2007 | Guerra ............... B29C 70/72 |
| | | 156/242 |
| 2018/0317956 A1 | 11/2018 | Fleming et al. |
| 2019/0008543 A1 | 1/2019 | Scoggins et al. |
| 2019/0274706 A1 | 9/2019 | Nott et al. |
| 2021/0196334 A1 | 7/2021 | Sarley et al. |

OTHER PUBLICATIONS

International Preliminary Report on Patentability issued in corresponding International Application No. PCT/IB2022/053815 dated Oct. 24, 2023, 6 pages.

* cited by examiner

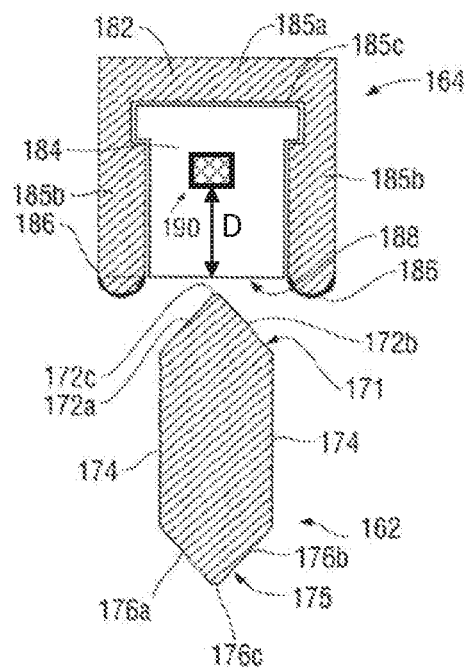
FIG. 3A
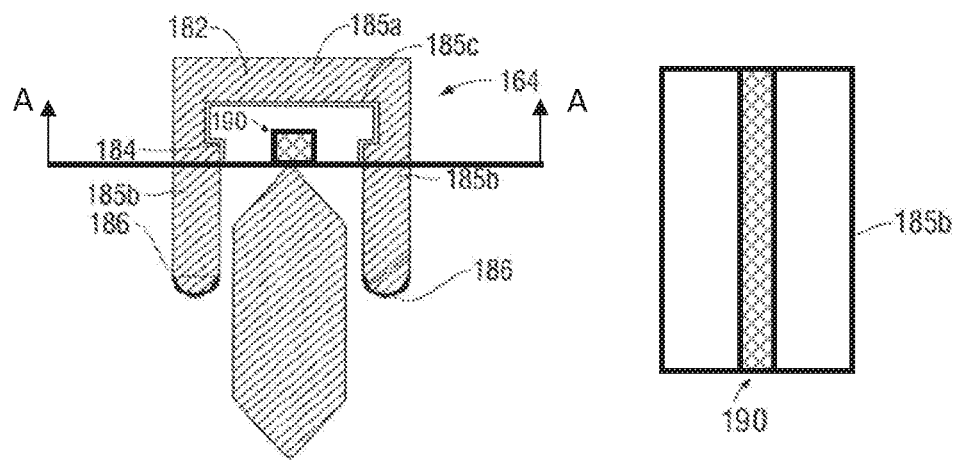
FIG. 3B
FIG. 3C

ULTRASONIC SURGICAL INSTRUMENTS FOR DETECTING WEAR IN JAW LINER

CROSS-REFERENCE TO RELATED APPLICATIONS

This application is a 371 National Stage Application of International Application No. PCT/IB2022/053815, filed Apr. 25, 2022, which claims the benefit of, and priority to, U.S. Provisional Patent Application No. 63/183,255, filed on May 3, 2021, the entire contents of each of which are hereby incorporated herein by reference.

BACKGROUND

Technical Field

The present disclosure relates to ultrasonic surgical instruments for detecting wear in a jaw liner. More particularly, the present disclosure relates to ultrasonic surgical instruments that detect wear in the jaw liner with an incorporated sensor.

Background of Related Art

Ultrasonic surgical instruments include ultrasonic transducers that vibrate attached structures, e.g., blades, to seal, transect, and/or otherwise treat tissue. Some ultrasonic surgical instruments may include, for example, a clamp mechanism to enable clamping of tissue against the blade. Ultrasonic energy transmitted to the blade causes the blade to vibrate at very high frequencies, which allows for heating tissue to treat tissue clamped against or otherwise in contact with the blade. However, rapid movements of the blade against a jaw liner of the clamp mechanism (directly or indirectly) wears out the jaw liner. When the jaw liner is worn beyond a threshold, performance and/or efficacy of the ultrasonic surgical instruments are decreased.

SUMMARY

According to various aspects of the present disclosure, an end effector assembly of an ultrasonic surgical instrument includes an ultrasonic blade mechanically coupled to an ultrasonic transducer configured to transmit ultrasonic vibration energy to the ultrasonic blade and a jaw member movable relative to the ultrasonic blade from a spaced-apart position to an approximated position for clamping tissue therebetween. The jaw member includes a structural body and a jaw liner engaged with the structural body. The jaw liner defines a tissue contacting surface positioned to oppose the ultrasonic blade in the approximated position, and includes a wear indicator disposed within the jaw liner and configured to provide an alert indicating that the jaw liner is worn beyond a pre-determined threshold.

According to aspects of the present disclosure, the jaw liner is made of an insulating material.

According to aspects of the present disclosure, the insulating material is PTFE.

According to further aspects of the present disclosure, the wear indicator is disposed at a predetermined depth within the jaw liner from the tissue contacting surface.

According to still further aspects of the present disclosure, the wear indicator is disposed at the predetermined depth along a longitudinal axis of the structural body.

According to still further aspects of the present disclosure, the predetermined depth is based on a life cycle of the jaw liner.

According to various aspects of the present disclosure, the wear indicator is made of an electrically conductive material.

According to aspects of the present disclosure, when the jaw liner wears out to expose the wear indicator and the jaw member moves to the approximated position, the wear indicator and the ultrasonic blade form an electrically closed circuit.

According to aspects of the present disclosure, the alert is electrically sent when the electrically closed circuit is formed. The alert includes a sound, light, message on a display, haptic vibration, or any combination thereof.

According to further aspects of the present disclosure, the electrically conductive material is graphite.

According to still further aspects of the present disclosure, the alert is an audible sound produced by contact between the wear indicator and the ultrasonic blade. The wear indicator is a metal or ceramic.

According to still further aspects of the present disclosure, when the jaw liner wears out to expose the wear indicator and the jaw member moves to the approximated position, the metal makes an audible sound while the ultrasonic blade vibrates in contact therewith.

According to still further aspects of the present disclosure, when the jaw liner wears out to expose the wear indicator, the color of the wear indicator is visible.

According to still further aspects of the present disclosure, the wear indicator is a ceramic. A resistance value of the wear indicator is lowered as the jaw liner wears out.

According to still further aspects of the present disclosure, an ultrasonic surgical instrument includes a housing, an ultrasonic transducer installed in the housing, adapted to connect to a source of energy, and produce ultrasonic vibration energy, and an end effector. The end effect may be configured similar to any of the aspects detailed above. For example, the end effector assembly may include an ultrasonic blade mechanically coupled to the ultrasonic transducer and configured to receive the ultrasonic vibration energy therefrom and a jaw member movable relative to the ultrasonic blade from a spaced-apart position to an approximated position for clamping tissue therebetween. The jaw member includes a structural body and a jaw liner engaged with the structural body. The jaw liner defines a tissue contacting surface positioned to oppose the ultrasonic blade in the approximated position and includes a wear indicator configured to send an alert indicating that the jaw liner is worn beyond a pre-determined threshold.

BRIEF DESCRIPTION OF THE DRAWINGS

The present disclosure may be understood by reference to the accompanying drawings, when considered in conjunction with the subsequent, detailed description, in which:

FIG. 3A is a transverse, cross-sectional view of the end effector assembly of FIG. 2 in an initial condition according to various aspects of the present disclosure;

FIG. 3B is a transverse, cross-sectional view of the end effector assembly of FIG. 2 in a worn condition according to various aspects of the present disclosure; and FIG. 3C is a longitudinal, cross-sectional view of the end effector assembly of FIG. 3B taken across section line "A-A" according to various aspects of the present disclosure.

DETAILED DESCRIPTION

Figure 1A:
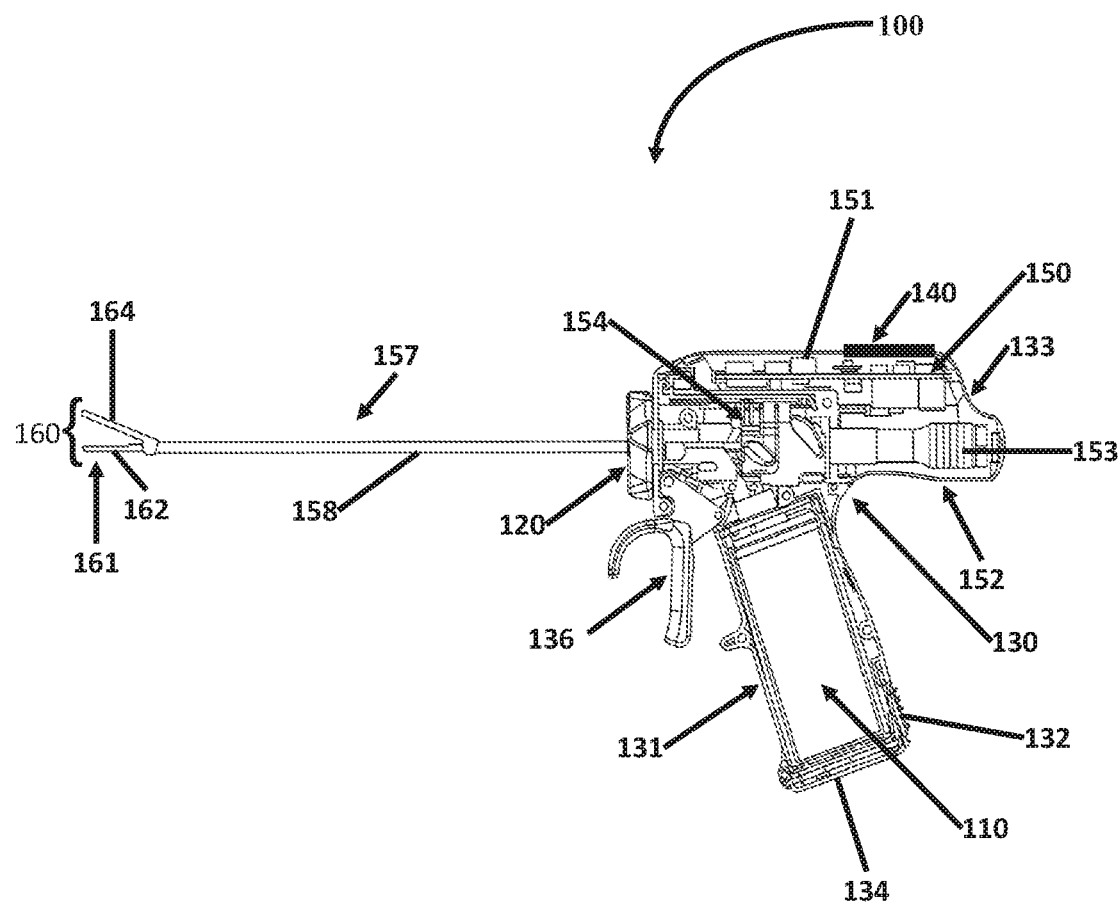
FIG. 1A is a side view of an ultrasonic surgical instrument according to various aspects of the present disclosure.

Aspects of the presently disclosed ultrasonic surgical instruments are described in detail with reference to the drawings, in which like reference numerals designate identical or corresponding elements in each of the several views. As used herein the term "distal" refers to the portion of the surgical instrument or component thereof that is closer to the patient, while the term "proximal" refers to the portion or component that is farther from the patient.

In the following description, well-known functions or constructions are not described in detail to avoid obscuring the present disclosure in unnecessary detail. Those skilled in the art will understand that the present disclosure may be adapted for use with either an endoscopic instrument, a laparoscopic instrument, or an open instrument. It should also be appreciated that different electrical and mechanical connections and other considerations may apply to each particular type of instrument.

Referring to FIG. 1A, an ultrasonic surgical instrument 100 for treating tissue with a portable power source and generator is illustrated. The ultrasonic surgical instrument 100 includes a power source 110, a housing 130, a transducer 150 including a generator assembly 151, and an elongated assembly 157. The power source 110 provides DC power to the transducer 150. In aspects, the power source 110 may be a portable power source, such as a battery, that can be attached to the ultrasonic surgical instrument 100 to provide DC power at any location. The power source 110 may be insertable or integrated into the housing 130 so that the ultrasonic surgical instrument 100 may be portably carried without disturbances of any cable.

In aspects, the power source 110 may include a converter that is connected to an alternating current (AC) power source and converts the AC power to DC power. The AC power source may be of a relatively low frequency, such as about 60 hertz (Hz), while the ultrasonic surgical instrument 100 operates at a higher frequency. Thus, the power source 110 may convert the low frequency AC power to DC power so that the DC power may then be inverted to AC power having a frequency suitable to cause the transducer 150 to generate ultrasonic mechanical motions. However, other configurations are also contemplated.

Figure 1B:
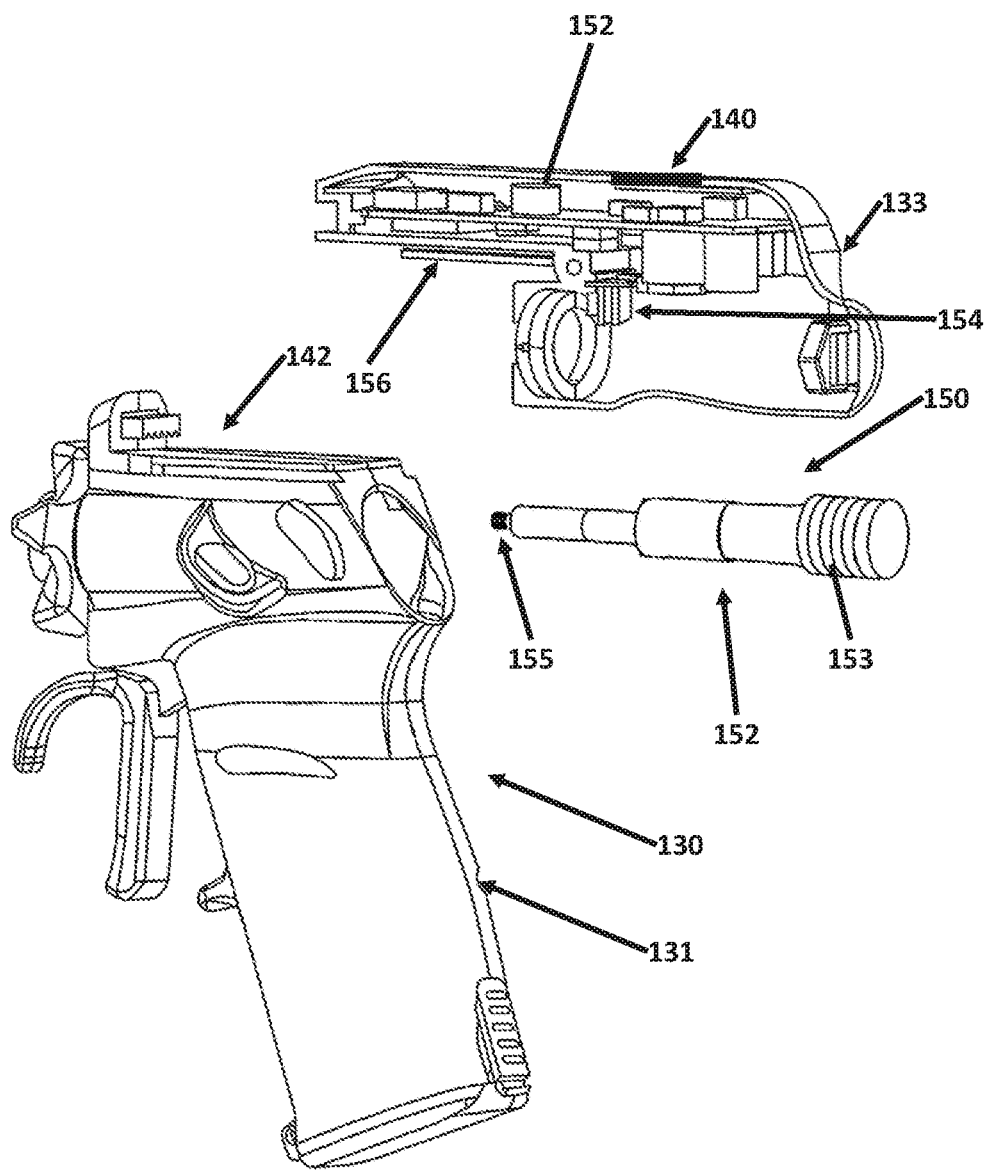
FIG. 1B is a perspective, partial cut-away view, with parts separated, of the ultrasonic surgical instrument of FIG. 1A according to various aspects of the present disclosure.

With continued reference to FIGS. 1A and 1B, the housing 130 includes a handle portion 131 having a compartment 132, which may house the power source 110, and a power source door 134 that secures the power source 110 within the compartment 132. In an aspect, the power source door 134 may be configured to form a water-tight, hermetic, or aseptic seal between the interior and the exterior of the compartment 132.

The housing 130 also includes a cover 133, which houses the transducer 150 and an output device 140. The transducer 150 includes a generator assembly 151 and a transducer assembly 152, having a transducer body 153 and a locking portion 155 (FIG. 1B). The generator assembly 151 is electrically coupled to the transducer assembly 152 via a pair of contacts 154.

With reference to FIG. 1B, the transducer 150 is illustrated as being separate from the cover 133. When the transducer 150 is inserted into and assembled with the cover 133, the pair of contacts 154 is connected to the transducer 150 so that the rotational movement of the transducer body 153 does not disrupt the connection between the transducer body 153 and the generator assembly 151, and is capable of freely rotating within the housing 130.

The output device 140 outputs information about the ultrasonic surgical instrument 100 and may display, for example, a status of a jaw liner 184 (FIG. 2A). For example, the status may be an alert or warning that the jaw liner 184 has been worn out to a level that the jaw liner 184 needs to be replaced.

The handle portion 131 further includes a trigger 136. When the trigger 136 is actuated, the power source 110 provides energy to the transducer 150 so that the transducer 150 is powered to generate ultrasonic mechanical motions along the elongated assembly 157. As the trigger 136 is released, the power supply to the transducer 150 is terminated.

The generator assembly 151 receives the DC power from the power source 110 and generates AC signals having a frequency greater than 20 kHz. The generator assembly 151 can generate signals having a frequency based on a desired mode of operation, which may be at or different from the resonant frequency of the transducer 150.

The transducer body 153 of the transducer assembly 152 receives the AC signal generated by the generator assembly 151 and generates ultrasonic mechanical motion along the elongated assembly 157 based on the amplitude and the frequency of the generated AC signal. The transducer body 153 includes one or more piezoelectric elements, which converts the generated AC signal into ultrasonic mechanical motions.

The ultrasonic surgical instrument 100 also includes a spindle 120, which is coupled to the elongated assembly 157 and allows for rotation of the elongated assembly 157 about its longitudinal axis. The elongated assembly 157 is attached to the housing 130 and is mechanically connected to the transducer 150 via the locking portion 155 such that as the spindle 120 is rotated about the longitudinal axis defined by the elongated assembly 157, the elongated assembly 157 and the transducer 150 are also rotated correspondingly without affecting the connection between the transducer 150 and the elongated assembly 157.

The elongated assembly 157 may include an end effector 160, which includes a jaw member 164 and a blade 162 suitable for sealing, transecting, and/or otherwise treating tissue. The blade 162 extends from the outer driver sleeve 158. The elongated assembly 157 is mechanically coupled to the transducer body 153 via the locking portion 155.

A proximal portion of the outer drive sleeve 158 is operably coupled to the trigger 136 of the handle portion 131, while a distal portion of the outer drive sleeve 158 is operably coupled to the jaw member 164. As such, the trigger 136 is selectively actuatable to move the outer drive sleeve 158 to pivot the jaw member 164 relative to the blade 162 of the end effector 160 from a spaced-apart position to an approximated position for clamping tissue between the jaw member 164 and the blade 162. The spindle 120 is rotatable in either direction to rotate the elongated assembly 157 in either direction relative to the handle portion 131.

The elongated assembly 157 further includes a waveguide 161, which extends through the outer drive sleeve 158. The waveguide 161 defines the blade 162 at a distal end thereof. The blade 162 serves as the blade of the end effector 160. The waveguide 161 is mechanically coupled to the transducer 150 such that ultrasonic motion produced by the transducer 150 is transmitted along the waveguide 161 to the blade 162 for treating tissue clamped between the blade 162 and the jaw member 164 or positioned near the blade 162.

The jaw member 164 may be formed as a pivoting arm configured to grasp and/or clamp tissue between the jaw member 164 and the blade 162. When the jaw member 164 and the blade 162 grasp tissue and the blade 162 conveys the ultrasonic mechanical motions, temperature of the grasped tissue between the blade 162 and the jaw member 164 increases due to friction created by the ultrasonic mechanical motions. This heating, in turn treats, e.g., seals and/or transects, the tissue. In aspects, the blade 162 may vibrate at an appropriate velocity based on a size of the tissue, e.g., blood vessel, to be sealed. By controlling the velocity of the mechanical motions of the blade 162, the heating rate of the tissue, e.g., vessel, may be controlled so that the vessel can be effectively sealed and/or transected.

Figure 2:
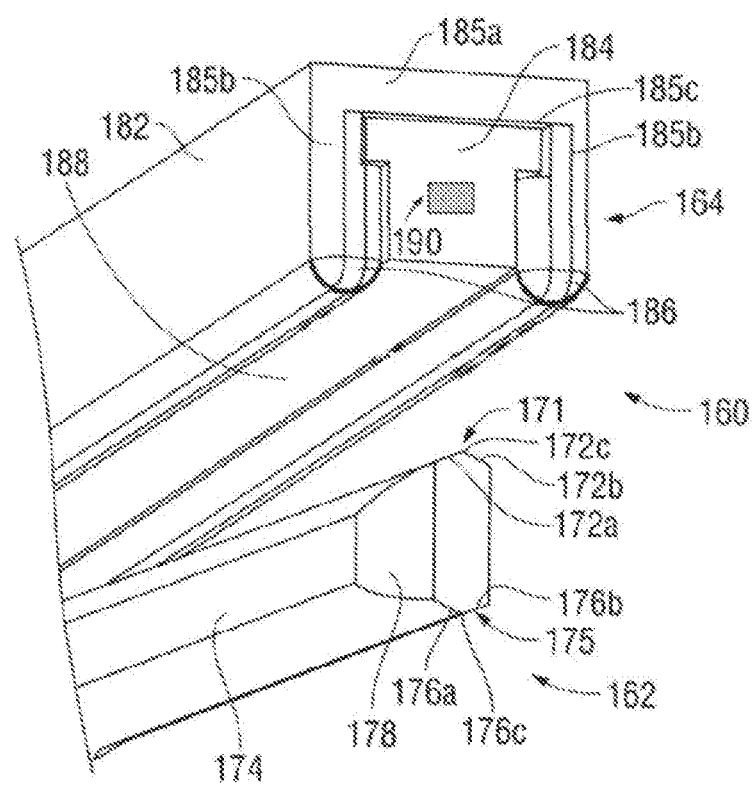
FIG. 2 is an enlarged, perspective view of a distal portion of an end effector assembly configured for use with the surgical instrument of FIG. 1A, or any other suitable surgical instrument or system.

Referring to FIG. 2, the end effector assembly 160 of the ultrasonic surgical instrument 100 of FIG. 1A may be utilized with any other suitable surgical instruments and/or surgical systems, including robotic surgical systems. The blade 162 may define a linear configuration, a curved configuration, or any other suitable configuration, e.g., straight and/or curved surfaces. With respect to curved configurations, the blade 162 may be curved in any direction relative to the jaw member 164, for example, such that the distal tip of the blade 162 is curved towards the jaw member 164, away from the jaw member 164, or laterally (in either direction) relative to the jaw member 164.

In aspects, the blade 162 defines a generally convex first tissue contacting surface 171, e.g., the surface that opposes the jaw member 164 in the approximated position thereof. Generally, the convex first tissue contacting surface 171 may be defined by a pair of surfaces 172a, 172b (flat or convex surfaces) that converge at an apex 172c, or may be formed by a continuously arcuate surface defining the apex 172c. The blade 162 may further define substantially flat lateral surfaces 174 on either side of the first tissue contacting surface 171, and a second tissue contacting surface 175 opposite the first tissue contacting surface 171 and similarly configured relative thereto, e.g., with surfaces 176a, 176b converging at an apex 176c, although other configurations may be also contemplated.

The waveguide 161 (FIG. 1A) or at least the portion of the waveguide 161 proximally adjacent the blade 162 may define a cylindrical-shaped configuration. Plural tapered surfaces (not shown) may interconnect the cylindrically-shaped waveguide 161 with the polygonal (or rounded-edge polygonal) configuration of the blade 162 to define smooth transitions between the body of the waveguide 161 and the blade 162. Additionally, an inwardly tapered surfaces 178 may extend from the lateral surfaces 174 at the distal end of the blade 162 such that the distal end of the blade 162 defines a narrowed configuration as compared to the body of the blade 162.

The first tissue contacting surface 171 is configured to contact tissue clamped between the blade 162 and the jaw member 164 for treating clamped tissue, e.g., sealing and/or transecting the clamped tissue, while a second tissue contacting surface 175 may be utilized for, e.g., tissue transection, back scoring, etc. The distal end of the blade 162 and/or some or all of the other surfaces of the blade 162 may additionally or alternatively be utilized to treat tissue.

The jaw member 164 of the end effector assembly 160 includes a more-rigid structural body 182 and a more-compliant jaw liner 184. The structural body 182 may be formed from an electrically conductive material, e.g., stainless steel, or may include electrically conductive portions. The structural body 182 includes a pivot (not shown), which pivotably receives the jaw member 164 relative to blade 162. This pivot configuration enables transitions between a spaced-apart position and an approximated position to clamp tissue between the blade 162 and the jaw liner 184 of the jaw member 164.

The jaw liner 184 may be made of an insulating material (e.g., PTFE (Teflon)) and include a sensor 190 or a wear indicator configured to detect a level of wear thereof. The sensor 190 is disposed or impregnated within the jaw liner 184 along the longitudinal axis of the structural body 182. In aspects, the longitudinal extension of the sensor 190 may be shorter than the length of the structural body 182 and/or the jaw liner 184. In this regard, the sensor 190 may be disposed near the proximal portion, the distal portion, or in the middle of the structural body 182 and/or jaw liner 184. Multiple sensors 190 along at least a portion of the length of the jaw liner 184 are also contemplated, e.g., proximal, middle, and/or distal sensors 190. Sensor 190 is electrically coupled, e.g., via a lead wire, electrically-conductive materials, contacts, and/or any other suitable components, or via a wireless connection, to power source 110, output device 140, and/or transducer 150 to enable communication therewith.

The structural body 182 of the jaw member 164 further includes a backspan 185a and a pair of spaced-apart uprights 185b extending from the backspan 185a in generally perpendicular orientation relative to the backspan 185a and generally parallel orientation relative to one another. The backspan 185a and the uprights 185b cooperate to define a cavity 185c therein, which defines an elongated, generally T-shaped configuration for slidable receipt and retention of the jaw liner 184 therein, although other suitable configurations for receiving and retaining the jaw liner 184 are also contemplated. The shape of the jaw liner 184 may also follow the shape or configuration of the cavity 185c so that the jaw liner 184 can be matingly fitted with or received by the cavity 185c.

In aspects, the sensor 190 may also serve as a retention for the jaw liner 184. Thus, the shape of the sensor 190 may follow a part or all of the shape of the jaw liner 184.

Referring to FIGS. 3A-3C, transverse, cross-sectional views of the end effector assembly 160 of FIG. 2 are illustrated. The sensor 190 is disposed or impregnated within the jaw liner 184 at a predetermined distance D from a contacting surface 188 of the jaw liner 184. The predetermined distance D is based on a life cycle of the jaw liner 184, meaning that the desired level of performance and/or efficacy may not be met when the jaw liner 184 wears out more than the predetermined depth D. The contacting surface 188 can be contacted by tissue or the apex 172c of the blade 162. The shape of the sensor 190 may be rectangular or in any shape extending along the longitudinal direction of the structural body 182 of the jaw member 164. The location of the sensor 190 within the jaw liner 184 may be vertically aligned with the apex 172c of the blade 162. As surgical operations are performed by the ultrasonic surgical instrument 100, the contacting surface 188 of the jaw liner 184 is worn out and recedes, decreasing a thickness or depth of the jaw liner 184. When the jaw liner 184 has been worn out and the contacting surface 188 recedes the predetermined depth D, the sensor 190 is exposed and contacts tissue or the apex 172c of the blade 162 as shown in FIG. 3B.

In aspects, the sensor 190 may be an electrically conductive material (e.g., graphite, silver, gold, copper, etc.). When the contacting surface 188 reveals the sensor 190, the apex 172c or tissue may contact the surface of the sensor 190, thereby completing an electrically closed circuit. The electrically closed circuit may be completed between the electrically conductive material and the blade 162 or in any other suitable manner. This closed circuit may electrically trigger an alert indicating that the jaw liner 184 is to be replaced. The alert may be provided by output device 140, e.g., a message displayed on a display, a flashing light, haptic feedback which causes the ultrasonic surgical instrument 100 to vibrate, an audible sound by a speaker, or any combination thereof. The alert is not limited to this list but can include any other means readily available to persons of skill in the art. As an alternative to or in addition to an alert, the closed circuit condition may terminate the supply of power from the power source 110, disable transducer 150, or otherwise impede further activation to inhibit damage to the instrument and/or patient.

In aspects, the sensor 190 may be a pressure sensor. Thus, when the pressure sensor 190 is revealed and pressure by the blade 162 or tissue is applied to the pressure sensor 190, an alert or other response is triggered.

In aspects, the sensor 190 may be a metal plate. When the apex 172c of the blade 162 vibrates while contacting the metal plate, friction between the metal plate and the apex 172c makes audible sounds so that the user is alerted to stop the procedure and/or replace the jaw liner 184. In aspects, the metal plate may have saw-tooth shapes or any repetitive shapes on the surface facing the blade 162 so that audible sounds are amplified when the apex 172c vibrates against the surface of the metal plate. In further aspects, the sensor 190 may be made of any materials (e.g., ceramic, etc.) other than the metal but still configured to provide an audible sound.

In aspects, the sensor 190 is made of a colored material. When the colored material is exposed from the jaw liner 184, its user may be able to see a change in color in the middle of the jaw liner 184. The color of the colored material may be red, yellow, florescent, or any other color outstanding/different from the color of the jaw liner 184. Thus, when the sensor 190 is revealed, the user is readily alerted.

In aspects, the sensor 190 may be a resistive sensor, which is semiconductive. When the liner 184 wears out, thereby decreasing the thickness of the liner 184, the resistance of the sensor 190 also decreases. If the resistance value of the sensor 190 becomes lower than a predetermined threshold, the alert is triggered.

While several aspects of the disclosure have been shown in the drawings and/or described herein, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope of the claims appended hereto.

What is claimed is:

1. An end effector assembly of an ultrasonic surgical instrument, the end effector assembly comprising:
   an ultrasonic blade configured to mechanically couple to an ultrasonic transducer configured to transmit ultrasonic vibration energy to the ultrasonic blade; and
   a jaw member movable relative to the ultrasonic blade from a spaced-apart position to an approximated position for clamping tissue therebetween,
   wherein the jaw member includes:
      a structural body; and
      a jaw liner engaged with the structural body, the jaw liner defining a tissue contacting surface positioned to oppose the ultrasonic blade in the approximated position and including a wear indicator configured to send an alert indicating that the jaw liner is worn beyond a pre-determined threshold.

2. The end effector assembly according to claim 1, wherein the jaw liner is made of an insulating material.

3. The end effector assembly according to claim 2, wherein the insulating material is PTFE.

4. The end effector assembly according to claim 1, wherein the wear indicator is disposed at a predetermined depth within the jaw liner from the tissue contacting surface.

5. The end effector assembly according to claim 4, wherein the wear indicator is disposed at the predetermined depth along a longitudinal axis of the structural body.

6. The end effector assembly according to claim 4, wherein the predetermined depth is based on a life cycle of the jaw liner.

7. The end effector assembly according to claim 4, wherein the wear indicator is made of an electrically conductive material.

8. The end effector assembly according to claim 7, wherein, when the jaw liner wears out to expose the wear indicator and the jaw member moves to the approximated position, the wear indicator and the ultrasonic blade form an electrically closed circuit.

9. The end effector assembly according to claim 8, wherein the alert is electrically sent when the electrically closed circuit is formed.

10. The end effector assembly according to claim 9, wherein the alert includes a sound, light, message on a display, haptic vibration, or any combination thereof.

11. The end effector assembly according to claim 7, wherein the electrically conductive material is graphite.

12. The end effector assembly according to claim 4, wherein the alert is an audible sound produced by contact between the wear indicator and the ultrasonic blade.

13. The end effector assembly according to claim 12, wherein the wear indicator is a metal or ceramic.

14. The end effector assembly according to claim 13, wherein, when the jaw liner wears out to expose the wear indicator and the jaw member moves to the approximated position, the wear indicator makes an audible sound while the ultrasonic blade vibrates in contact therewith.

15. The end effector assembly according to claim 4, wherein the alert is a visual color change.

16. The end effector assembly according to claim 15, wherein the wear indicator is made of a colored material which is different from a color of the jaw liner.

17. The end effector assembly according to claim 16, wherein, when the jaw liner wears out to expose the wear indicator, the color of the wear indicator is visible.

18. The end effector assembly according to claim 1, wherein the wear indicator is an resistive element.

19. The end effector assembly according to claim 1, wherein a resistance value of the wear indicator is lowered as the jaw liner wears out.

20. An ultrasonic surgical instrument comprising:
   the end effector assembly according to claim 1;
   a housing; and an ultrasonic transducer installed in the housing, adapted to connect to a source of energy, and mechanically coupled to the ultrasonic blade to transmit ultrasonic vibration energy to the ultrasonic blade.

* * * * *